Figure 1:
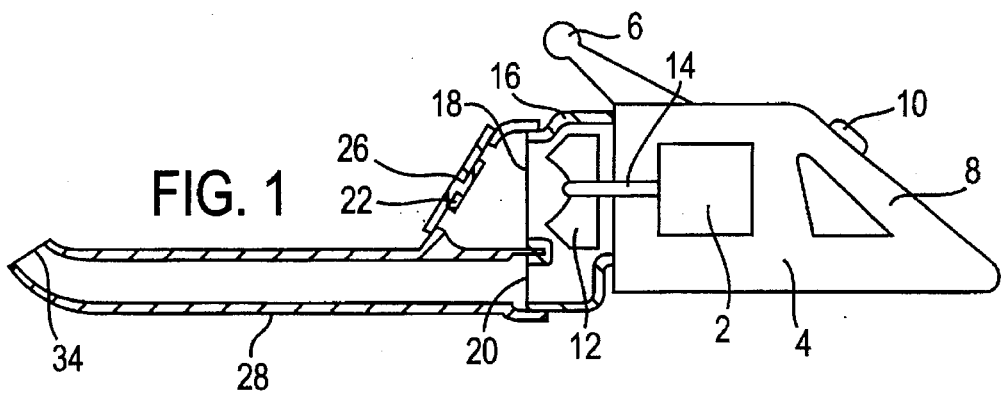

United States Patent [19]

Webster et al.

[11] Patent Number: 5,659,920

[45] Date of Patent: Aug. 26, 1997

[54] BLOWER VACUUM DEVICE OF IMPROVED DESIGN

[75] Inventors: Craig Webster, Jesmond; John Sadler, Darlington, both of United Kingdom

[73] Assignee: Black & Decker Inc., Newark, Del.

[21] Appl. No.: 613,566

[22] Filed: Mar. 11, 1996

[30] Foreign Application Priority Data

Mar. 11, 1995 [GB] United Kingdom ............... 9504972

[51] Int. Cl.⁶ ....................................................... A47C 9/32
[52] U.S. Cl. ............................... 15/344; 15/330; 15/405
[58] Field of Search ............................. 15/328, 330, 344, 15/403, 408, 409

[56] References Cited

U.S. PATENT DOCUMENTS

| | | | |
|---|---|---|---|
| 2,024,367 | 12/1935 | Eriksson-Jons | 15/330 |
| 4,288,886 | 9/1981 | Siegler | 15/344 |
| 4,290,165 | 9/1981 | Hiramatsu et al. | 15/330 |
| 4,413,371 | 11/1983 | Tuggle et al. | 15/328 |
| 4,451,951 | 6/1984 | Satoh . | |
| 4,694,528 | 9/1987 | Comer et al. | 15/330 |
| 4,955,107 | 9/1990 | Kawai | 15/330 |
| 5,245,726 | 9/1993 | Role et al. . | |
| 5,535,479 | 7/1996 | Pink et al. | 15/330 |

FOREIGN PATENT DOCUMENTS 324972    2/1930    United Kingdom ............... 15/328

*Primary Examiner*—David Scherbel
*Assistant Examiner*—Terrence Till
*Attorney, Agent, or Firm*—Charles E. Yocum; Kerry H. Owens; Dennis A. Dearing

[57] ABSTRACT

A blower vacuum device of the kind having a motor (2) which is located in a housing (4) and which drives an impeller (12) located in a the volute (16). The volute (16) has an air inlet (18) and an air outlet (20). When the device is used as a blower a blower attachment (28), formed in a single piece from a blower duct (28) and a grill (22), is releasably attached to the volute so that the grill (22) is attached over the air inlet of the volute and the blower duct (28) is attached over the air outlet. When the device is used as a vacuum, a vacuum attachment (36) which is formed in one piece from a suction duct (30) and a collecting bag duct (34) is releasably attached to the volute so that the suction duct (30) is attached over the air inlet and the collecting bag duct (34) is attached over the air outlet. This means that it is easy to change the device between a blowing mode and a vacuum mode by detaching a single piece blowing attachment from the device and replacing it with a single piece vacuum attachment.

13 Claims, 1 Drawing Sheet

BLOWER VACUUM DEVICE OF IMPROVED DESIGN

The present invention relates to a Blower Vacuum Device of the type which has a blower attachment which enables the device to work in a blowing mode to blow debris and a vacuum attachment which enables the device to work in a vacuum mode to suck up debris. Such devices are commonly used in gardens to blow debris such as leaves and grass cuttings into piles and to then suck the debris up into a collecting bag for disposal.

Known devices of this kind have a motor which is located in a housing and which drives an impeller located in a volute. The volute has an air inlet located in front of the impeller and an air outlet located radially of the impeller.

When the device is used as a blower a grill is attached over the air inlet of the volute and a blower duct in the form of a tube is attached over the air outlet so that the blower duct extends radially of the impeller. When the motor is switched on the impeller rotates and draws an airstream into the air inlet and expels it radially out of the air outlet. The user holds the device with the blower duct pointing predominately downwards to blow debris on the floor into piles.

When the device is used as a vacuum the grill and the blower duct are detached from the volute. A suction duct is placed over the air inlet so that it extends axially in front of the impeller. Also a collecting bag is connected over the outlet from the volute. When the motor is switched on the impeller rotates and draws an airstream axially through the suction, duct and expels the airstream radially out of the volute and into the collecting bag. This airstream carries debris up the suction duct through the volute and into the collecting bag. The user holds the device so that the suction duct points predominantly downwards to suck up debris from the floor.

The problem with this type of known device is that a user may find it inconvenient to change the device between the blowing mode and the vacuum mode. Also the user might mislay the various attachments to the device. This latter problem has been solved to some extent for the grill by providing grills that are at all times linked to the main body of the device.

The aim of the present invention is to provide a blower vacuum device which is more convenient to use and with attachments which are less easily mislaid.

Accordingly the present invention provides a blower vacuum device comprising:
 a motor in a housing,
 an impeller which is drivable by the motor,
 a volute within which the impeller is located having an air inlet and an air outlet, and
 a blower attachment including;
 a blower duct which is releasably attachable over the air outlet, and a grill which is releasably attachable over the air inlet,
  wherein the blower duct and the grill are integrated to form a one-piece blower attachment.

Because the blower attachment is of one piece construction instead of a separate blower duct and grill it is simpler for a user a convert the device to and from the blowing mode. Also as the grill now forms part of the blowing attachment there are no small sized attachments which are easily mislaid.

In order to vary the blowing air speed of the device when used as a blower it is preferable that the area of the grill through which air can flow is variable. Thus when the grill is attached over the air inlet the area through which air can flow can be varied. The larger this area is, the greater is the blowing air speed of the device.

According to a further aspect of the present invention, there is provided a blower vacuum device comprising:
 a motor in a housing,
 an impeller which is drivable by the motor,
 a volute within which the impeller is located having an air inlet and an air outlet, and
 a vacuum attachment including;
 a suction duct which is releasably attachable over the air inlet, and
 a collecting bag duct which is releasably attachable over the air outlet,
  wherein the suction duct and the collecting bag duct are integrated to form a single piece vacuum attachment.

Similarly, because the vacuum attachment is of a single piece construction instead of a separate suction duct and collecting bag duct it is simpler for a user to convert the device to and from the vacuuming mode.

Preferably the volute is formed so that the air inlet and the air outlet face in the same direction. This makes for a simple design of the single piece blower and vacuum attachments and easy connection between the attachments and the volute.

For an ergonomic, in line, design preferably the volute is formed so that the air inlet and the air outlet face forwards of the impeller.

The device may include a handle arrangement which extends radially of an axis on which the impeller is located. Preferably the air outlet is located to one side of an axis on which the impeller is located and the handle arrangement extends to the opposite side of the axis to the air outlet. The handle arrangement can conveniently comprise a primary forward handle and a secondary rearward handle.

Figure 2:
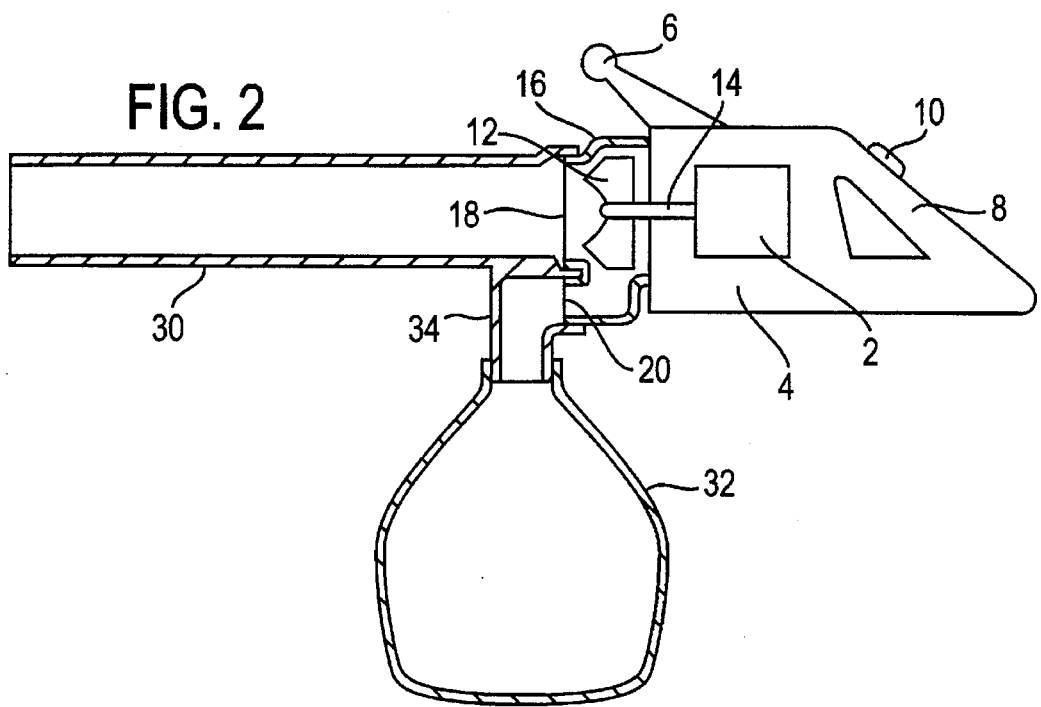
Figure 3:
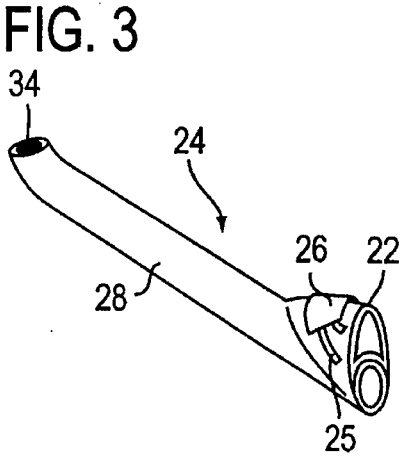
Figure 4:
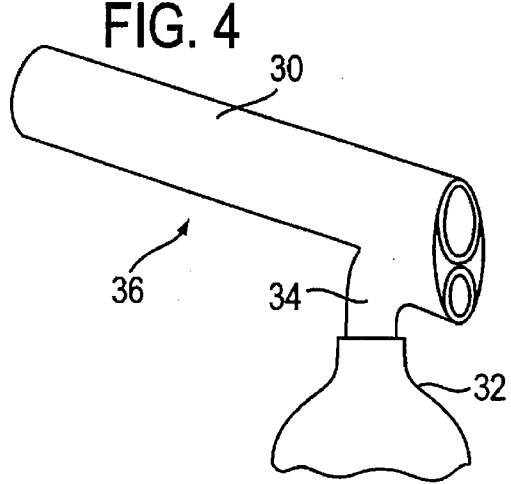

The present invention will now be further described with reference to the following figures in which:

FIG. 1 shows a cross-sectional view of the first aspect of the present invention with a device in the blowing mode, FIG. 2 shows a cross-sectional view of the second part of the present invention with a device in the vacuuming mode, FIG. 3 shows a perspective view of a blowing attachment for the device in FIG. 1 and FIG. 4 shows a perspective view of a vacuum attachment for the device in FIG. 2.

The device shown in FIG. 1 comprises a motor (2) located within a motor housing (4). On the housing (4) is located a forward primary handle (6) and a secondary rearward handle (8). A switch (10) for operating the motor (2) is located on the secondary handle (8).

The motor (2) drives an impeller (12) which is mounted rotatably on a drive shaft (14). The impeller (12) is located within a volute (16) which has an air inlet (18) which faces forward of the impeller (12) and an air outlet (20) which faces forward of the impeller (12). When the impeller (12) is driven by the motor (2) it sucks air into the volute (16) axially through the inlet (18) and expels air from the volute (16) radially towards the outlet (20).

When the device is to be used as a blower a blower attachment (24) shown in perspective in FIG. 3 is releasably attached to the volute (16) as shown in FIG. 1. The blower attachment (24) is formed in one piece of a blowing duct (28) having a nozzle (34) and a grill (22). The forward face of the grill (22) has holes 25 formed therein to allow air into the volute (16). A cover (26) is slideably mounted, by any conventional method known to one skilled in the art, to the grill (22) so that its position can be varied to cover different proportions of the holes 25 in the grill (22). This varies the area through which air can flow into the volute (16).

When the device is to be used as a vacuum a vacuum attachment (36) shown in perspective in FIG. 4 is releasably attached to the volute (16) as shown in FIG. 2. The vacuum attachment is formed in one piece of a suction duct (30) and a collecting bag duct (34). A porous collecting bag (32) can be releasably attached to the end of the collecting bag duct (34) distant from the air outlet (20).

In use of the device as a blower a user places one hand on the primary handle (6) and the other hand on the secondary handle (8). The user can then depress the switch (10) to activate the motor (2). The motor (2) drives the drive shaft (14) which in turn drives the impeller (12). The rotation of the impeller (12) draws air into the volute (16) through the grill (22) which is attached over the air inlet (18). The impeller (12) expels air from the air outlet (20) which travels through the blower duct (28) and out of the nozzle (34). The air expelled from the nozzle (34) is used to blow debris about. The user can vary the blowing air speed by sliding the cover (26) on the grill (22) to vary the area of the holes 25 through which the air is drawn into the volute (16). The larger this area is, the greater the blowing air speed.

In use of the device as a vacuum a user holds the device and operates the motor in the same way as when using the device as a blower. The rotation of the impeller (12) draws air into the volute (16) through the suction duct (30) which is attached over the air inlet (18). This air is then expelled from the volute (16) out of the air outlet (20) and into the collecting bag (32) via the collecting bag duct (34) which is attached over the outlet (20). This air flow sucks debris into the suction duct (30) and transports the debris through the impeller and into the collecting bag (32). Because the collecting bag is porous, the air can escape.

To change between modes a user need only detach a one piece attachment from the volute and replace it with a further one piece attachment.

What is claimed is:

1. A blower vacuum device comprising:
    a motor in a housing,
    an impeller which is drivable by the motor,
    a volute within which the impeller is located having an air inlet and an air outlet, and
    a blower attachment including,
    a blower duct which is releasably attachable over the air outlet, and
    a grill which is releasably attached over the air inlet,
    wherein the blower duct and the grill are integrated to form a single piece blower attachment.

2. A device accordingly to claim 1 wherein the area of the grill through which air can flow into the volute is variable.

3. A device according to claim 1 wherein the volute is formed so that the air inlet and the air outlet face in the same direction.

4. A device according to claim 3 wherein the volute is formed so that the air inlet and the air outlet face forwards of the impeller.

5. A device according to claim 1 additionally including a handle arrangement which extends radially of an axis on which the impeller is located.

6. A device according to claim 5 wherein the air outlet is located to one side of the axis on which the impeller is located and the handle arrangement extends to an opposite side of the axis to the air outlet.

7. A device according to claim 6 wherein the handle arrangement comprises a primary forward handle and a secondary rearward handle.

8. A blower vacuum device comprising:
    a motor in a housing,
    an impeller which is drivable by the motor,
    a volute within which the impeller is located having an air inlet and an air outlet, wherein the air inlet and the air outlet face in the same direction, and
    a vacuum attachment including,
    a suction duct which is releasably attachable over the air inlet, and a collecting bag duct which is releasably attachable over the air outlet,
    wherein the suction duct and the collecting bag duct are integrated to form a single piece vacuum attachment.

9. A device according to claim 3 wherein a porous collecting bag is releasably attachable over the end of the collecting bag duct distant from the air outlet.

10. A device according to claim 8 additionally including a handle arrangement which extends radially of an axis on which the impeller is located.

11. A device according to claim 9 wherein the handle arrangement comprises a primary forward handle and a secondary rearward handle.

12. A blower vacuum device comprising:
    a motor in a housing,
    an impeller which is drivable by the motor,
    a volute within which the impeller is located having an air inlet and an air outlet,
    a vacuum attachment including,
    a suction duct which is releasably attachable over the air inlet, and a collecting bag duct which is releasably attachable over the air outlet,
    wherein the suction duct and the collecting bag duct are integrated to form a single piece vacuum attachment that is attachable in only one fixed position on the volute.

13. A blower vacuum device comprising:
    a motor in a housing,
    an impeller which is drivable by the motor,
    a volute within which the impeller is located having a single air inlet and a single air outlet,
    a vacuum attachment including,
    a suction duct which is releasably attachable over the single air inlet, and a collecting bag duct which is releasably attachable over the single air outlet,
    wherein the suction duct and the collecting bag duct are integrated to form a single piece vacuum attachment.

* * * * *